(12) United States Patent
Smith

(10) Patent No.: US 12,542,060 B2
(45) Date of Patent: Feb. 3, 2026

(54) VEHICLE CONTROL SYSTEM

(71) Applicant: Transportation IP Holdings, LLC, Norwalk, CT (US)

(72) Inventor: Brian Scott Smith, Suwanee, GA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 844 days.

(21) Appl. No.: 17/513,103

(22) Filed: Oct. 28, 2021

(65) Prior Publication Data
US 2023/0133518 A1    May 4, 2023

(51) Int. Cl.
G08G 1/00      (2006.01)
B61L 27/10     (2022.01)
B61L 27/14     (2022.01)
G08G 1/052     (2006.01)

(52) U.S. Cl.
CPC ........... *G08G 1/20* (2013.01); *B61L 27/10* (2022.01); *B61L 27/14* (2022.01); *G08G 1/052* (2013.01)

(58) Field of Classification Search
CPC ........ G08G 1/20; G08G 1/0145; G08G 1/052; B61L 27/12; B61L 27/16
USPC ..................................................... 701/20, 19
See application file for complete search history.

(56) References Cited

U.S. PATENT DOCUMENTS

| | | | |
|---|---|---|---|
| 9,235,991 B2 | 1/2016 | Cooper et al. | |
| 9,376,971 B2 * | 6/2016 | Luther | F02D 29/02 |
| 10,822,007 B2 | 11/2020 | Cooper et al. | |
| 2009/0299555 A1 * | 12/2009 | Houpt | B61L 27/16 701/19 |
| 2012/0290182 A1 * | 11/2012 | Cooper | B61L 27/16 701/70 |
| 2013/0144467 A1 | 6/2013 | Kickbusch et al. | |
| 2013/0144670 A1 | 6/2013 | Kickbusch | |
| 2014/0094998 A1 * | 4/2014 | Cooper | B61L 15/0036 701/2 |
| 2016/0009304 A1 * | 1/2016 | Kumar | B61L 27/40 701/19 |
| 2016/0362022 A1 * | 12/2016 | Mathews, Jr. | G01C 21/26 |
| 2017/0282942 A1 * | 10/2017 | Mathews, Jr. | B61L 15/0062 |
| 2018/0037241 A1 * | 2/2018 | Sharma | B61L 15/0058 |

(Continued)

OTHER PUBLICATIONS

Wabtec Corporation, "Movement Planner" WabtecCorp.com, 2019 (1 page).

*Primary Examiner* — Helal A Algahaim
*Assistant Examiner* — Leah N Miller
(74) *Attorney, Agent, or Firm* — K&L Gates LLP

(57) ABSTRACT

A control system is provided that obtains a movement plan that includes schedules for movements of vehicle systems traveling in a network of routes. The movement plan may be generated by a network control system located off-board the vehicle systems. The control system may obtain pacing directives associated with different segment of the routes that a first vehicle system of the vehicle systems is traveling or will travel on according to the movement plan. The pacing directives may dictate upper limits and/or lower limits on movement of the first vehicle system in the different segments of the routes while the vehicle systems are traveling according to the schedules of the movement plan. The control system may control movement of the first vehicle system to meet the schedules of the movement plan while the first vehicle system moves according to the pacing directives in the corresponding different segments of the routes.

20 Claims, 5 Drawing Sheets

(56) References Cited

U.S. PATENT DOCUMENTS

2019/0389498 A1\* 12/2019 Grimm ................ G01C 21/005
2021/0261178 A1\* 8/2021 Brooks ............... B61L 15/0062

\* cited by examiner

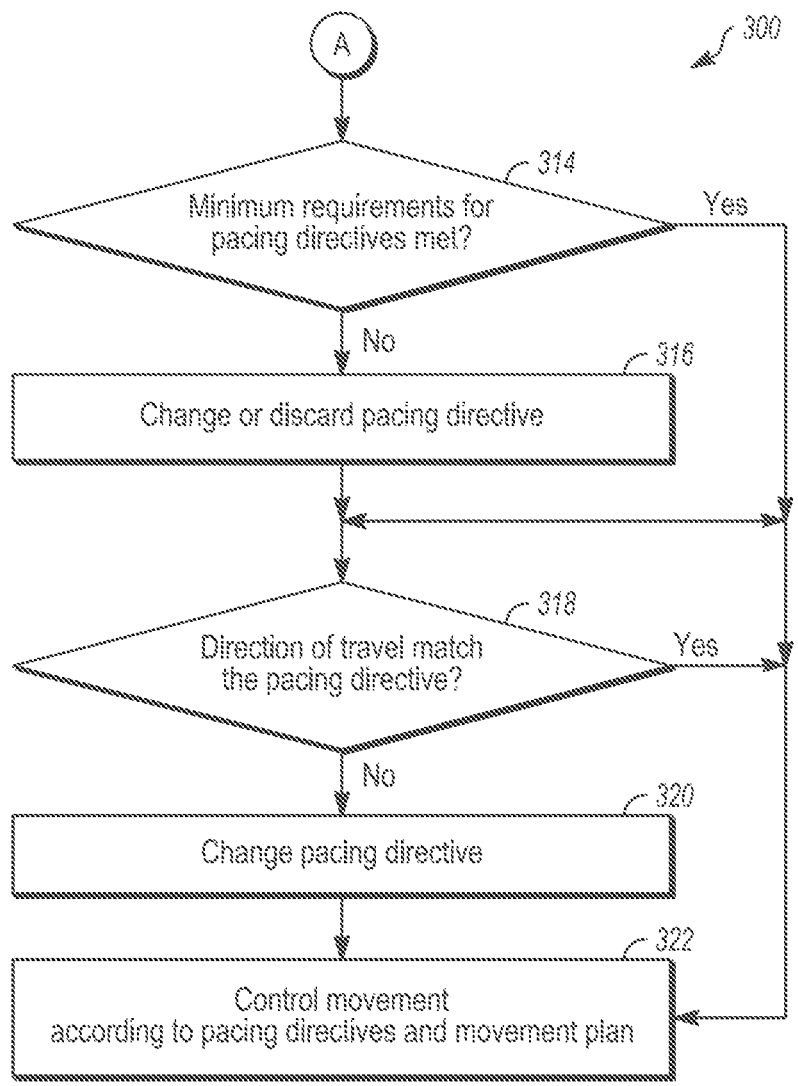
FIG. 5B
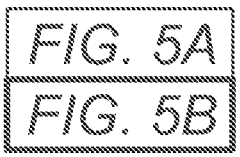

VEHICLE CONTROL SYSTEM

BACKGROUND

Technical Field

The subject matter described herein relates to controlling movements of plural vehicle systems (single or multi-vehicle systems). While one or more examples provided herein relate to rail vehicles, not all embodiments are limited to rail vehicles. One or more embodiments can be used in connection with controlling movements of non-rail vehicles, such as automobiles, trucks, marine vessels, mining vehicles, agricultural vehicles, or other off-highway vehicles (e.g., vehicles that are not designed and/or are not permitted for travel on public roadways).

Discussion of Art

Some vehicle systems rely on network optimization software to control the flow of vehicular traffic. For example, several major (e.g., Class I) railroad corporations may use network optimization software to control the flow of railway traffic through rail networks for increased throughput, while emphasizing a preference for on-time delivery and the priority of cargo carried by the railway traffic. One example of such software is referred to as MOVEMENT PLANNER. The network optimization software primarily accomplishes business objectives by controlling wayside devices in signal-controlled territories (Centralized Traffic Control, or CTC, territories), and automatically issuing form-based authorities (e.g., track warrants) in non-signaled territory.

But at least some of the known software systems lack the ability to control the throttle and braking of the vehicle systems within the network of routes (or route network). This may result in an inability to regulate the speed of vehicle systems to meet the business objectives planned by the network optimization software. This granular deficiency in the ability to consistently and effectively implement the movement plan may detract from the benefits provided by the network optimization software, and consequently the savings to the companies or other entities that own the vehicle systems.

BRIEF DESCRIPTION

In one example, a method is provided that includes obtaining a movement plan that includes schedules for movements of vehicle systems traveling in a network of routes. The movement plan may be generated by a network control system located off-board the vehicle systems. The method also may include determining pacing directives associated with different segment of the routes. The pacing directives may dictate upper limits and/or lower limits on movement for travel by the vehicle systems in the different segments of the routes while the vehicle systems are traveling according to the schedules of the movement plan. The method also may include controlling movement of the vehicle systems to meet the schedules of the movement plan while the vehicle systems move according to the pacing directives in the corresponding different segments of the routes.

In another example, a control system is provided that includes one or more processors that may obtain at least part of a movement plan that includes schedules for movements of vehicle systems traveling in a network of routes. The movement plan may be generated by a network control system located off-board the vehicle systems. The one or more processors may obtain pacing directives associated with different segment of the routes that a first vehicle system of the vehicle systems is traveling or will travel on according to the movement plan. The pacing directives may dictate upper limits and/or lower limits on movement of the first vehicle system in the different segments of the routes while the vehicle systems are traveling according to the schedules of the movement plan. The one or more processors may control movement of the first vehicle system to meet the schedules of the movement plan while the first vehicle system moves according to the pacing directives in the corresponding different segments of the routes.

In another example, another method includes obtaining a movement plan that includes schedules for movements of vehicle systems traveling in a network of routes. The movement plan may be generated by a network control system located off-board the vehicle systems. The method also may include determining pacing directives associated with different segment of the routes for a first vehicle system of the vehicle systems. The pacing directives may dictate upper limits and/or lower limits on movement of the vehicle systems in the different segments of the routes while the vehicle systems are traveling according to the schedules of the movement plan. The method also may include controlling movement of the first vehicle system to meet the schedules of the movement plan while the first vehicle system moves according to the pacing directives in the corresponding different segments of the routes.

BRIEF DESCRIPTION OF THE DRAWINGS

The inventive subject matter may be understood from reading the following description of non-limiting embodiments, with reference to the attached drawings, wherein below:

FIGS. 5A and 5B illustrate a flowchart of one example of a method for controlling movement of one or more vehicle systems.

DETAILED DESCRIPTION

Figure 1:
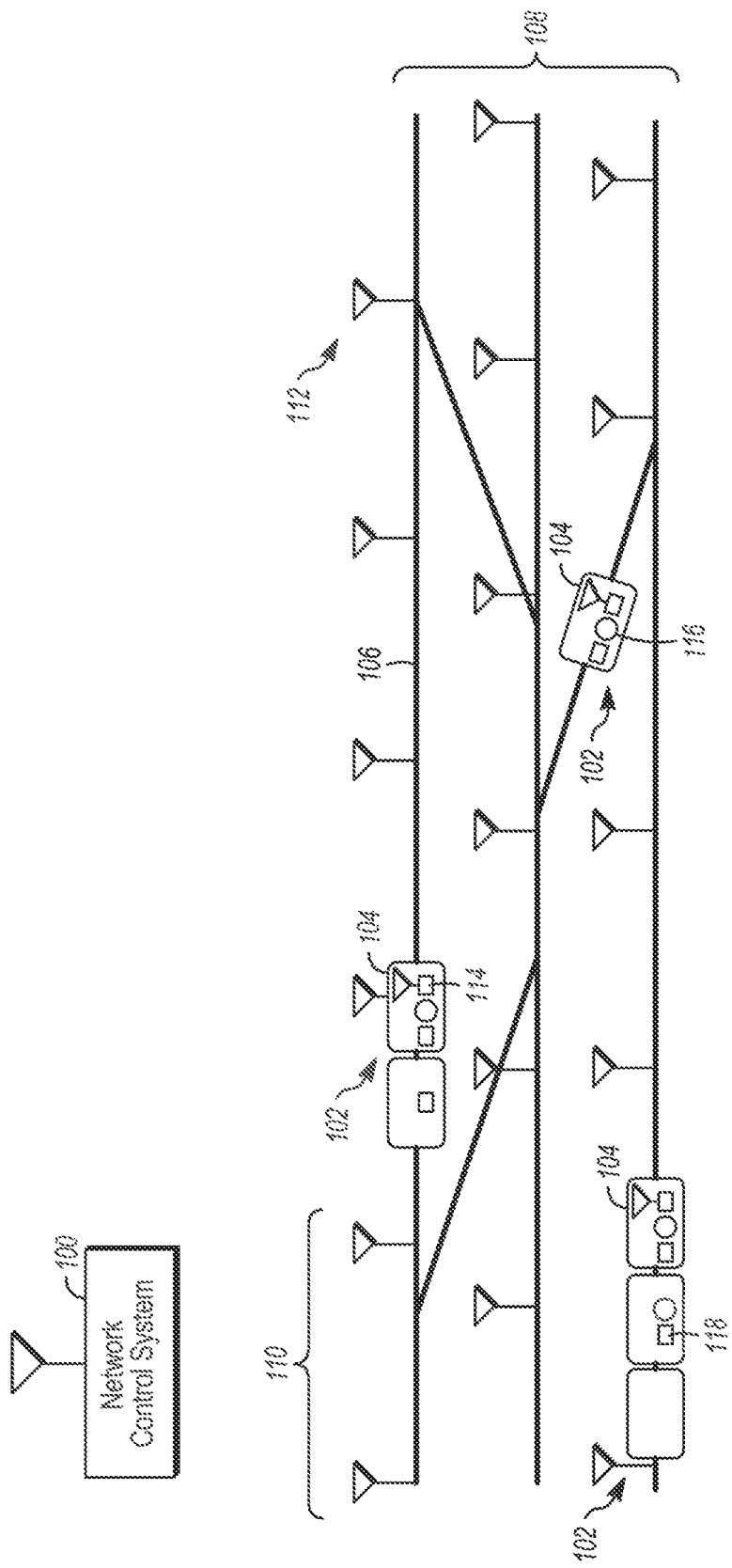
FIG. 1 illustrates one example of a network control system for vehicle systems.

Embodiments of the subject matter described herein relate to network control systems and methods that control movements of multiple vehicle systems in a network of routes. The systems and methods incorporate energy management (EM) systems and methods (e.g., which may be otherwise implemented in software onboard the vehicle systems) into an extended implementation of a network optimization software. This incorporation operates by achieving a managed pacing of vehicle systems via operational controls (e.g., throttle and/or braking controls) so that the vehicle systems move and arrive at locations dictated by the network optimization software. While one or more examples provided herein relate to rail vehicles, not all embodiments are limited to rail vehicles. One or more embodiments can be used in connection with controlling movements of non-rail vehicles, such as automobiles, trucks, marine vessels, mining vehicles, agricultural vehicles, or other off-highway vehicles (e.g., vehicles that are not designed and/or are not permitted for travel on public roadways). Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles.

The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

An energy management system (EMS) onboard one or more vehicles in a vehicle system may include a system of software and/or hardware that controls the speed and braking of the vehicle(s) for various purposes, such as conserving energy (e.g., fuel, electric energy, etc.), reducing emissions, reducing audible noise, etc. A movement planning system (MPS) can be used to manage and optimize concurrent movements of several vehicle systems. For example, a movement planning system can dictate schedules, routes, etc. for the vehicle systems to travel to control throughput of the vehicle systems in a network of interconnected routes. The group of schedules and routes to be taken by the vehicle systems can be referred to as a movement plan. The movement plan can be generated by a network control system that is off-board the vehicles.

In one embodiment of the inventive subject matter described herein, the network control system can generate pacing directives that define locations where one or more pacing instructions control how vehicles move within the areas associated with pacing directives. The pacing instructions dictate various movement requirements and/or movement restrictions on the vehicle systems. The pacing directives can be associated with different segments of the routes, with the vehicle systems being required to move according to the different pacing instructions of the pacing directives while moving on the corresponding segments of the routes associated with the different pacing directives.

FIG. 1 illustrates one example of a network control system 100 for vehicle systems 102. The network control system can represent hardware circuitry that includes and/or is connected with one or more processors (e.g., one or more microprocessors, field programmable gate arrays, integrated circuits, or the like) that perform the operations described herein in connection with the network control system. As described above, each of the vehicle systems can represent one or more vehicles 104 that travel together along one or more routes 106 in a network 108 of the routes. The network of routes may include more or fewer routes than what is shown in FIG. 1. For example, the network of routes may include dozens, hundreds, or thousands of routes extending over dozens, hundreds, or thousands of square miles or square kilometers.

The network control system can divide the routes into different segments 110. For example, different lengths of the routes can be comprised of different segments. The segments may be different lengths or the same length. The segments can be defined by markers 112 (e.g., mileposts, signs, intersections between routes, switches at the intersections, etc.), distances (e.g., number of miles or kilometers from a designated location), or the like. The network control system can determine schedules of upcoming and/or current travel of the vehicle systems. For example, schedules of the vehicle systems can be input into the network control system by operators, dispatchers, owners of the vehicle systems, or the like. Optionally, the network control system can determine areas within the network of routes where limitations on movements of the vehicle systems may be needed due to maintenance or repair of segments of the routes, damaged portions of the route segments, vehicles occupying route segments, high traffic areas (e.g., areas within the route network where the density of vehicle systems is greater than a threshold density), etc.

The network control system can determine pacing instructions to control throughput of the vehicle systems through the route network. These pacing instructions can be used to reduce traffic density, to increase the number of vehicles reaching scheduled stops on time, or the like. The pacing instructions can be manually input, can be automatically determined, or can be defaults for different segments of the routes.

The pacing directives and pacing instructions can be communicated from the off-board network control system to vehicle control systems 114 disposed onboard the vehicle systems. The network control system and the vehicle control systems can include wireless transceiving hardware for this communication, such as antennas, modems, or the like. The vehicle control systems can represent hardware circuitry that includes and/or is connected with one or more processors (e.g., one or more microprocessors, field programmable gate arrays, integrated circuits, or the like) that perform the operations described herein in connection with the vehicle control systems. The vehicle control systems can include energy management systems and/or the network control system can include or represent a movement planning system. The movement planning system can create a movement plan formed from several different schedules for different vehicle systems and can communicate all or only the relevant part of the movement plan to the different vehicle systems.

One or more vehicles in each vehicle system can include a propulsion system 116 that operates to propel the vehicle system (e.g., which may include one or more engines, motors, or the like) and/or a braking system 118 that operates to slow or stop movement of the vehicle system (e.g., which may represent friction brakes, air brakes, dynamic brakes that use the same motors that also propel the vehicle system, etc.). The vehicle control system can automatically control operation of the propulsion system and/or braking system to control movement of the vehicle system. Optionally, the vehicle control system can implement manual control of the propulsion system and/or braking system based on input provided by one or more operators onboard or off-board the vehicle system. The vehicle control system can control (and/or direct control of) the propulsion system and/or braking system to ensure that the vehicle system moves according to the pacing directives dictated by the network control system.

The vehicle control systems can automatically control operational settings (e.g., throttle settings, brake settings, and/or time of arrival at a location) of the vehicle systems to guide the vehicle systems to follow the movement requirements and/or movement restrictions of the pacing instructions that are received from the network control system as the vehicle systems move through different route segments associated with different pacing directives. This automatic control can involve changing the operational settings of the propulsion system and/or braking system without operator intervention, and/or can involve the vehicle control systems disregarding or changing manual control of the operational settings of the propulsion system and/or braking system that contradicts or conflicts with the directives. Optionally, the vehicle control systems can direct operators onboard the vehicle systems how to manually control the operational settings of the vehicle systems to guide the vehicle systems to follow the movement requirements and/or movement restrictions.

The pacing instructions can be lower limits or thresholds that the vehicle systems are required to remain at or above during movement in a route segment associated with a pacing directive having a pacing instruction. The pacing instructions can be upper limits or thresholds that the vehicle systems are required to remain at or below during movement in a route segment associated with a pacing directive having a pacing instruction. The pacing instructions can differ from other requirements or restrictions that apply to route segments. For example, a pacing instruction can change such that the requirements or restrictions of the pacing instruction are different at different times. In contrast, speed limits or minimum speed requirements associated with roadways or highways can be fixed and not change at different times.

One example of a pacing instruction is a maximum throttle setting. This may be a movement restriction that includes an upper limit or threshold on the throttle setting that the vehicle systems are allowed to use or implement while traveling in a route segment associated with the pacing directive of the maximum throttle setting. The vehicle systems may be able to use lower throttle settings (e.g., and thereby generate less tractive effort), but are prevented or directed to not implement throttle settings that are greater than the setting dictated by the pacing instruction.

The maximum throttle setting can be applied to all propulsion-generating vehicles in the vehicle system or to a subset or group (that is less than all) of the propulsion-generating vehicles in the same vehicle system. The maximum throttle setting may only apply while the vehicle system is moving at one or more speeds. For example, a maximum throttle setting may only apply while the vehicle system is moving at least as fast as a lower speed limit. As another example, a maximum throttle setting may only apply while the vehicle system is moving no faster than an upper speed limit.

Another example of a pacing instruction is a minimum time offset. This instruction can dictate how much time is available for the vehicle system to travel through the route segment. Greater values of the minimum time offset allow for the vehicle systems traveling in the route segment associated with the directive to travel at faster speeds (and thereby travel through the route segment in less time), while smaller values of the minimum time offset allow for the vehicle systems traveling in the route segment associated with the directive to travel at slower speeds (and thereby travel through the route segment over a longer period of time).

Another example of a pacing instruction is an energy conservation speed. This may be a movement directive dictates a speed at which vehicles are to travel through the route segment associated with the directive to consume less energy (e.g., fuel, electric energy, natural gas, hydrogen, etc.) when compared with traveling at another speed. For example, an energy conservation speed may require the vehicle system to travel slower than a speed limit of the route.

Another example of a pacing instruction is a time of arrival or arrival time. This instruction dictates a time at which a vehicle system traveling through a route segment associated with the directive is required to reach a location. The instruction can require the vehicle system to reach an end location of the route segment (along the direction of movement of the vehicle system) by a relative time or an absolute time. The relative time can be an amount of time elapsed since the vehicle system entered the route segment. For example, the instruction can dictate a relative time limit of two minutes for the vehicle system to reach the end of the route segment (after the vehicle system entered the route segment). The absolute time can be a time of day that the vehicle system is required to reach the end of the route segment. For example, the instruction can dictate an absolute time of 2:25 pm for the vehicle system to reach the end of the route segment.

The off-board network control system can set different pacing instructions for different route segments. The network control system can set directives for different segments such that two adjacent segments along the same route can have different directives or the same directive. For example, a route segment from a first milepost to a second milepost (which may or may not be the next milepost) may have a first pacing directive having a pacing instruction, the next route segment extending from the second milepost to a third milepost (which may or may not be the next milepost) may have a second pacing directive having a pacing directive that is different from the first pacing directive, and so on.

The pacing instructions can dynamically change by the network control system modifying one or more of the pacing instructions at different times while the vehicle systems are moving along the routes. The pacing instructions can change based on damage to the routes, damage to vehicle systems, changing weather patterns or other ambient conditions (e.g., where visibility may be negatively impacted by fog, precipitation such as snow, rain, or ice), decreased functionality of one or more vehicle systems (e.g., where a vehicle system may not be able to move as fast as before, may require more distance to slow or stop, etc.), to change the throughput of vehicle systems moving along the routes (e.g., where traffic density has changed such that there are fewer vehicle systems per unit area or more vehicle systems per unit area compared to when a previous directive was set or implemented), or the like.

Figure 2:
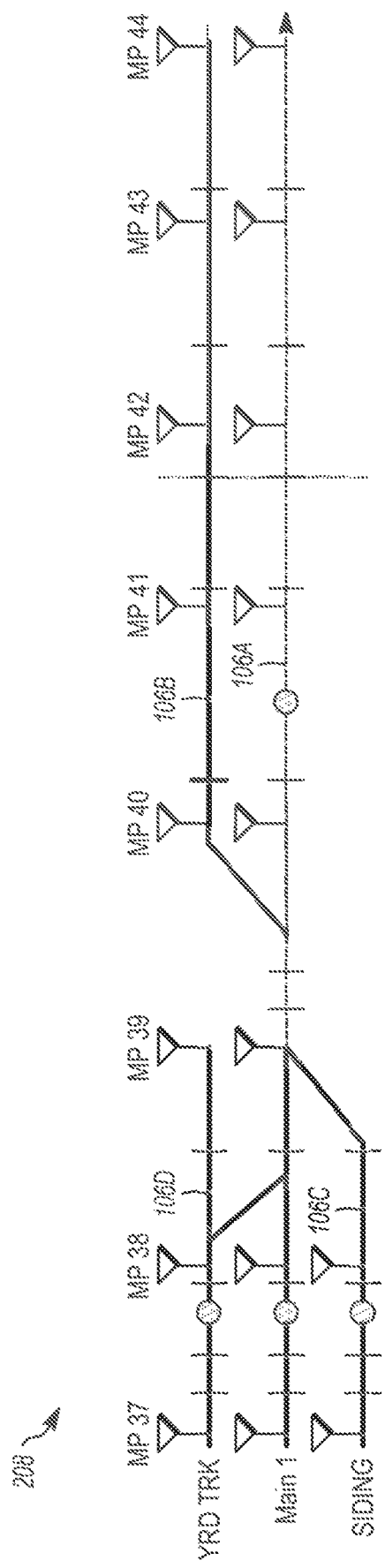
FIG. 2 illustrates another example of a network of routes.

FIG. 2 illustrates another example of a network 208 of the routes 106 (e.g., routes 106A-D). The route 106A can be a main route, such as a main track, a highway, or the like. The routes 106B, 106C can be side routes, such as track sidings, frontage roads, or the like. The route 106D can be a route within a vehicle yard, such as a track within a rail yard, a path within a parking lot, or the like. The pacing directives may be associated with one or more boundaries. The boundaries can define beginning and/or ends of the pacing directives. A boundary of a pacing directive can be a location where the pacing instructions associated with the pacing directive begin or end. For example, a pacing directive can have a beginning location or "from" location that indicates where the segment of the route associated with or governed by the pacing directive begins. With respect to the network of routes shown in FIG. 2, a beginning location for a pacing directive can be milepost 38 ("MP 38" in FIG. 2). Vehicle systems that reach the beginning or "from" location of a pacing boundary may begin to move (or change movement) to follow or otherwise abide by the pacing instruction of the pacing directive once the beginning or "from" location is reached. For example, a vehicle system traveling on the route 106A from left to right will begin moving according to the pacing instruction of a first pacing directive once the vehicle system reaches milepost 38. The vehicle systems may continue to follow the pacing instruction of the first pacing directive until another beginning or "from" location of a second pacing directive is reached, the pacing instruction of the first pacing directive dynamically changes, or another segment associated with another pacing directive is reached. As another example, a pacing directive can have an end location or "to" location that indicates where the segment of the route associated with or governed by the pacing directive ends. Vehicle systems that are traveling subject to the pacing directive continue to follow the pacing instruction(s) of that pacing directive until the end or "to" location is reached. With respect to the network of routes shown in FIG. 2, an end location for a pacing directive can be a location between mileposts 40 and 41 ("MP 40" and "MP 41" in FIG. 2), such as mile marker 40.5. The vehicle system traveling on the route 106A moves according to the pacing instruction(s) of this pacing directive until the vehicle system reaches mile marker 40.5.

The same pacing directive may be associated with different pacing directives. For example, the same segment of a route associated with a pacing directive can have multiple pacing instructions associated with different directions of movement such that a first vehicle system traveling in a first direction (e.g., east) in the pacing directive must follow or abide by a first pacing instruction, while a second vehicle system traveling in a different, second direction (e.g., west) in the same pacing directive must follow or abide by a different, second pacing instruction. With respect to the network of routes shown in FIG. 2, the first pacing instruction may be a "to" pacing instruction of a pacing directive on the route 106A that begins at milepost 38 and extends to the right of milepost 38 along the route 106. The second pacing instruction may be a "from" pacing instruction on the route 106A that ends at milepost 41. These pacing instructions may apply to vehicle systems that are moving from left to right on the route 106A in FIG. 2. But for a vehicle system moving in the opposite direction (e.g., right to left on the route 106A), the pacing instructions can be different or can be changed. The "to" pacing instruction can be a "from" pacing instruction (that ends at milepost 38 along the route 106A) and the "from" pacing instruction can be changed to a "to" pacing instruction (that begins at milepost 41 along the route 106A). The network control system can change the pacing instruction in this way.

The pacing directives with the associated pacing instructions can be provided to the vehicle control systems in addition to other, different directives and/or instructions related to restrictions (e.g., upper limits) and/or requirements (e.g., lower limits) on movements of the vehicle systems. One or more pacing directives can be associated with multiple pacing instructions. For example, movement within a route segment can be restricted by multiple different pacing instructions. When a pacing directive is associated with two or more pacing directives that conflict with each other (e.g., have different requirements and/or restrictions), the vehicle control systems (e.g., the energy management systems) can control the vehicle systems to follow the most restrictive instruction. For example, two different pacing instructions of the same pacing directive can direct vehicle systems to move such that a first pacing instruction requires slower movement than a second pacing instruction. Because the first pacing instruction is more restrictive with respect to allowable speeds at which the vehicle systems can move, the first pacing instruction may be used or may govern movement within the pacing directive over the second pacing instruction (and/or over other restrictions that are not part of a pacing directive). These other restrictions can include temporary speed restrictions (e.g., slow orders or work zone restrictions), civil speed limits, vehicle system-based restrictions (e.g., limits on weight per operating brake, limits on total length of a vehicle system, limits on weight that can be carried by the vehicle systems, limits on weight per dynamic brake axle, etc.), or the like.

As another example, the network control system and/or vehicle control system can select the pacing instruction (of two or more overlapping or conflicting pacing instructions) based on one or more physical characteristics of a route (e.g., or a track). These characteristics can include whether the route or route segment is a main line or main track versus a siding or sidetrack, whether the route or route segment is damaged, the number of lanes or tracks in a route segment, etc. With respect to the network of routes shown in FIG. 2, a first pacing instruction can extend from milepost 37 ("MP 37" in FIG. 2) on the siding route 106C to the milepost 42 ("MP 42") on the siding route 106B. This first pacing instruction can extend over part of the main route 106A (e.g., from milepost 39, or "MP 39" in FIG. 2, to the intersection between the routes 106A, 106B). A different, second pacing instruction can extend from milepost 38 ("MP 38" in FIG. 2) to milepost 42 ("MP 42" in FIG. 2) along the route 106A. The first and second pacing instructions therefore both extend over the section of the main route 106A from the intersection of the routes 106A, 106C to the intersection of the routes 106A, 106B. The network control system may prioritize the second pacing instruction over the first pacing instruction for the main route 106A. Stated differently, the first pacing instruction may still govern vehicle system movements on the siding routes 106B, 106C in the corresponding locations along those routes, but the second pacing instruction may govern vehicle system movements on the main route 106A along the corresponding segments of the route, including the segment of the route 106A where the first and second pacing instructions overlap. Alternatively, the network control system and/or the vehicle control system can disregard overlapping pacing instructions. For example, if two or more pacing instructions overlap, then the network control system can cancel or eliminate both pacing instructions, and/or the vehicle control system can ignore or disregard the overlapping pacing instructions.

The vehicle control systems can receive scheduled or planned movements of the vehicle systems and the pacing directives and control the vehicle systems to travel according to the scheduled or planned movements while abiding by the pacing instructions of the pacing directives while moving according to the scheduled or planned movements. For example, a vehicle control system may receive a schedule for the vehicle system to travel along designated routes to a destination location. This schedule may dictate the destination location (e.g., similar to a driver inputting a location to drive to in a navigation software system), the destination location and arrival time (e.g., similar to a train or bus schedule), the routes that the vehicle system is to travel on, or the like. The vehicle control system also can receive pacing directives and instructions associated with route segments along which the vehicle system will travel in the designated routes to the destination location. The vehicle control system controls the throttle settings, brake settings, etc., of the vehicle system according to the pacing instructions while also moving according to the scheduled or planned movements.

Some route segments may not be associated with a pacing directive. In one example, the network control system can create default pacing directive with a default pacing instruction for these route segments. These default pacing instructions can apply until a different pacing instruction is input or selected for a route segment. The off-board network control system can supply the pacing directives and pacing instructions. Optionally, the different pacing instruction can be provided onboard (e.g., by an operator).

Optionally, the network control system can extend the boundary of a pacing directive to eliminate route segments that do not have a pacing directive. For example, if a first pacing directive applies from a first milepost to a second milepost and a second pacing directive applies from a third milepost to a fourth milepost, the network control system can extend the first pacing directive from the first milepost to the third milepost or can extend the second pacing directive from the second milepost to the fourth milepost. This can eliminate the segment of the route from the second milepost to the third milepost from not having a pacing directive.

The network control system may have minimum requirements for a pacing directive. For example, the network control system may not create or communicate a pacing directive that applies in a route segment that is shorter than a designated distance. As another example, the network control system may not create or communicate a pacing directive that applies in a route segment that the vehicle system will be located in for less than a threshold period of time. This can reduce instances of the vehicle control system having to frequently and potentially rapidly change throttle settings and/or brake settings to follow frequently changing pacing directives. The minimum requirements for the pacing directives can change or be different at different times. With respect to the example shown in FIG. 2, a vehicle system may start a trip at milepost 39 but a "from" pacing directive may begin less than half of one mile from milepost 39. If the minimum requirement for pacing directives is two miles, then the network control system can change the pacing directive by changing the starting boundary location of the pacing directive. For example, the pacing directive can be changed to begin at the current location of or start of the trip for the vehicle system. As another example, a pacing directive for a route segment that the vehicle system is currently moving may end less than a minimum threshold distance (e.g., one mile) before the end of the scheduled trip for the vehicle system. The network control system can change the pacing directive by changing the ending boundary location of the pacing directive to match or extend beyond the end of the trip for the vehicle system.

The vehicle control system can disregard or replace pacing directives that do not comply with one or more of these requirements. For example, the vehicle control system may disregard (and not communicate to vehicle control systems) a pacing directive that is erroneous or does not satisfy a requirement (e.g., minimum distance or time). The vehicle control system can replace such a rejected pacing directive with a default pacing directive or modify the pacing directive to meet the requirements.

The network control system can tailor pacing directives to planned travels of a vehicle system. Alternatively, the vehicle control system can tailor the pacing directives as needed for the vehicle system. The pacing directives can be tailored by incorporating one or more of the pacing directives while the vehicle system is passing through an area, segment of the route, or the like, associated with the one or more pacing directives. The energy management system, the network control system, and/or an operator may define a start location, an end location, and route(s) to be traveled upon for the vehicle system to move from the start location to the end location along the route(s). The start location, end location, and/or the route(s) can be referred to as scheduled travel or a scheduled trip of the vehicle system. The pacing directive can continuously extend from a starting location to an end location such that there are no breaks or gaps in the locations or routes along which the pacing directive applies. But the start location, end location, and/or routes of the scheduled travel of the vehicle system may not coincide or match the starting location, end location, or routes of the pacing directive(s).

Instead, the pacing directives can be tailored to the scheduled travel of the vehicle system in a variety of different ways to ensure that the vehicle control system controls movement of the vehicle system without having to modify the pacing directives for each individual vehicle system (which could place too great of a processing burden on the network control system). The vehicle control system can, for that vehicle control system and no other vehicle control systems, treat the pacing directives as starting, ending, or extending through locations that may not be actually associated with or included in the pacing directives created or dictated by the network control system.

As a first example, the starting location of a pacing directive may be outside of the scheduled trip of a vehicle system, while the ending location of the same pacing directive and a portion (but not all) of the routes in the pacing directive are within the scheduled trip of the vehicle system. For example, the scheduled trip of the vehicle system may involve the vehicle system traveling along a route from a starting location of the trip at milepost 123 to an end location at milepost 234 on the same route (e.g., a main track). A pacing directive, however, may extend along the same route from a starting location at milepost 99 to an end location at milepost 211. As a result, the locations along the route that the pacing directive extends over partially overlap the route of the scheduled trip of the vehicle system (with the end location of the pacing directive being within the scheduled trip locations, but the starting location of the pacing directive being outside of the scheduled trip locations). The vehicle control system can receive the pacing directive but tailor the pacing directive (e.g., modify or change data stored in a memory or database of the vehicle control system) without the network control system changing the pacing directive. The vehicle control system can change the starting location of the pacing directive (as stored onboard the vehicle system but not for the same pacing directive as communicated to other vehicle control systems onboard other vehicle systems). For example, the vehicle control system can change the starting location of the pacing directive to begin at the same starting location of the scheduled trip of the vehicle system. This can ensure that the pacing directive coincides with the starting location of the scheduled trip. This can help prevent the pacing directive from being ignored or misapplied by the vehicle control system.

As another example, the ending location of a pacing directive may be outside of the scheduled trip of a vehicle system, while the starting location of the same pacing directive and a portion (but not all) of the routes in the pacing directive are within the scheduled trip of the vehicle system. For example, the scheduled trip of the vehicle system may involve the vehicle system traveling along a route from a starting location of the trip at milepost 567 to an end location at milepost 890 on the same route. A pacing directive, however, may extend along the same route from a starting location at milepost 601 to an end location at milepost 913. As a result, the locations along the route that the pacing directive extends over partially overlap the route of the scheduled trip of the vehicle system (with the end location of the pacing directive being outside the scheduled trip locations, but the starting location of the pacing directive being within the scheduled trip locations). The vehicle control system can receive the pacing directive but tailor the pacing directive without the network control system changing the pacing directive. The vehicle control system can change the ending location of the pacing directive (as stored onboard the vehicle system but not for the same pacing directive as communicated to other vehicle control systems onboard other vehicle systems). For example, the vehicle control system can change the ending location of the pacing directive to be located at the same ending location of the scheduled trip of the vehicle system. This can ensure that the pacing directive coincides with the ending location of the scheduled trip. This can help prevent the pacing directive from being ignored or mis-applied by the vehicle control system.

As another example, neither the starting location nor the ending location of a pacing directive may be within the scheduled trip of a vehicle system. For example, the scheduled trip of the vehicle system may involve the vehicle system traveling along a route from a starting location of the trip at milepost 111 to an end location at milepost 333 on the same route. A pacing directive, however, may extend along the same route from a starting location at milepost 97 to an end location at milepost 351. As a result, the locations along the route that the pacing directive extends over partially overlap the route of the scheduled trip of the vehicle system (with the start and end locations of the pacing directive being outside the scheduled trip locations). The vehicle control system can receive the pacing directive but tailor the pacing directive without the network control system changing the pacing directive. The vehicle control system can change the ending location of the pacing directive (as stored onboard the vehicle system but not for the same pacing directive as communicated to other vehicle control systems onboard other vehicle systems). For example, the vehicle control system can change the start and end locations of the pacing directive to be located at the same start and end locations, respectively, of the scheduled trip of the vehicle system. This can ensure that the pacing directive coincides with the starting and ending locations of the scheduled trip. This can help prevent the pacing directive from being ignored or mis-applied by the vehicle control system.

In another example, a pacing directive may extend from a starting location disposed on a first route to an end location disposed on a different, second route. The first and second routes may not be parallel tracks (for the entire lengths of the routes) or different lanes of the same road, but instead may be different roads, tracks, paths, or the like, that head in different directions (different end locations of the routes). A vehicle system may have scheduled travel along the first route but not the second route. The vehicle control system can receive the pacing directive but tailor the pacing directive without the network control system changing the pacing directive. The vehicle control system can change the start location of the pacing directive and/or the end location of the pacing directive (as stored onboard the vehicle system but not for the same pacing directive as communicated to other vehicle control systems onboard other vehicle systems). For example, the vehicle control system can change the start location of the pacing directive to be at the location where the vehicle system begins or enters into the first route and/or can change the end location of the pacing directive to be at the location where the length of the pacing directive leaves the first route and enters the second route (e.g., the intersection between the first route and the second route). This can ensure that the pacing directive is followed while the vehicle system is traveling on the first route between the start and end locations of the pacing directive. This can help prevent the pacing directive from being ignored or mis-applied by the vehicle control system.

Figure 3:
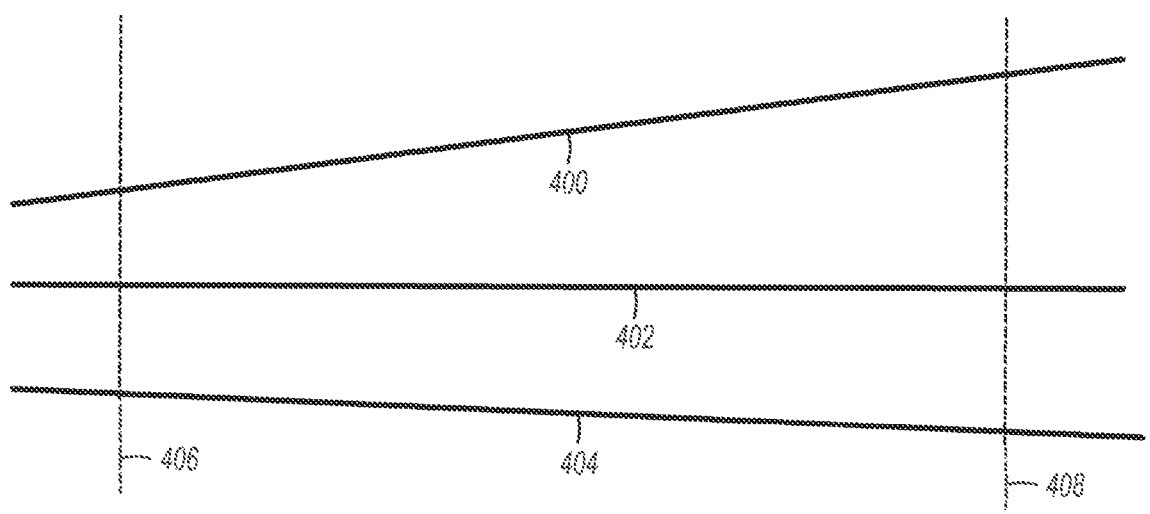
FIG. 3 illustrates an example of a pacing directive that encompasses several routes.

In another example, a pacing directive may apply to multiple routes at the same time. Several routes may be parallel or partially parallel to each other, and a pacing directive can extend from one plane that extends across multiple routes to another plane that also may extend across multiple routes. For example, each of first, second, and third routes may have a milepost 465 which are all located within a plane or a designated distance from a landmark (e.g., 465 miles from a state border). FIG. 3 illustrates this example of a pacing directive that encompasses several routes. In FIG. 3, a first route 400, second route 402, and third route 404 may be separate from each other in that each of these routes extends between different start and end locations. The routes may or may not intersect each other. The pacing directive can extend from a first milepost 406 to a second milepost 408, but not be assigned to or associated with any one of the routes (but instead all routes between the first and second mileposts). As shown, each of these mileposts extends across the three routes.

A vehicle control system can receive the pacing directive but tailor the pacing directive without the network control system changing the pacing directive. The vehicle control system can incorporate the pacing directive into the scheduled trip for the length of the first route, the second route, or the third route that the vehicle system is scheduled to travel along. For example, the vehicle control system can control or restrict movement of the vehicle system according to the pacing directive while the vehicle system is moving between the first milepost and the second milepost on any of the first, second, or third route.

Figure 4:
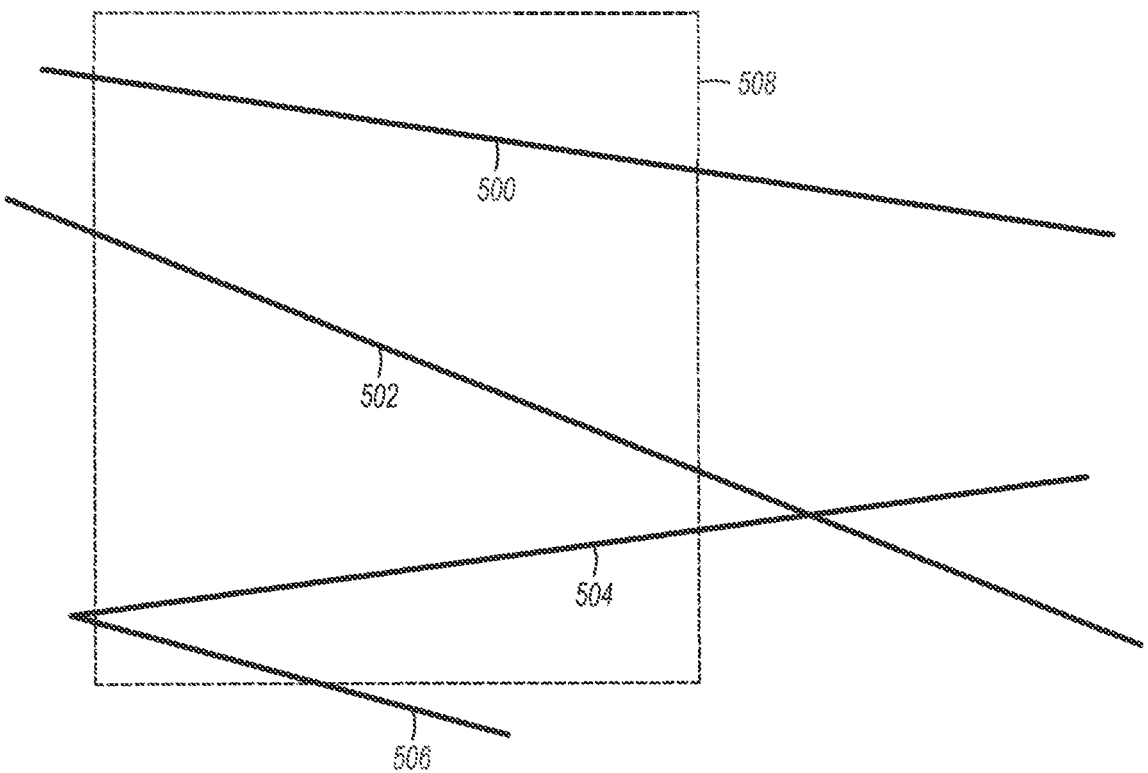
FIG. 4 illustrates another example of a pacing directive that encompasses several routes.

As another example, a pacing directive may apply to a geographic area such that all routes or segments of routes within that area are governed by the pacing directive. FIG. 4 illustrates this example of a pacing directive that encompasses several routes. In FIG. 4, a first route 500, second route 502, third route 504, and fourth route 506 may be separate from each other in that each of these routes extends between different start and end locations. The routes may or may not intersect each other, as shown in FIG. 3. The pacing directive can extend over a geographic area 508, which is shown as a rectangular shape (in a planar map) in FIG. 4, but optionally may have another polygon shape or non-polygon shape.

A vehicle control system can receive the pacing directive but tailor the pacing directive without the network control system changing the pacing directive. The vehicle control system can incorporate the pacing directive into the scheduled trip for the length of the first route, the second route, the third route, and/or the fourth route that the vehicle system is scheduled to travel along. For example, the vehicle control system can control or restrict movement of the vehicle system according to the pacing directive while the vehicle system is moving within the geographic area associated with the pacing directive, but not when the vehicle system is moving outside of this geographic area.

Figure 5A:
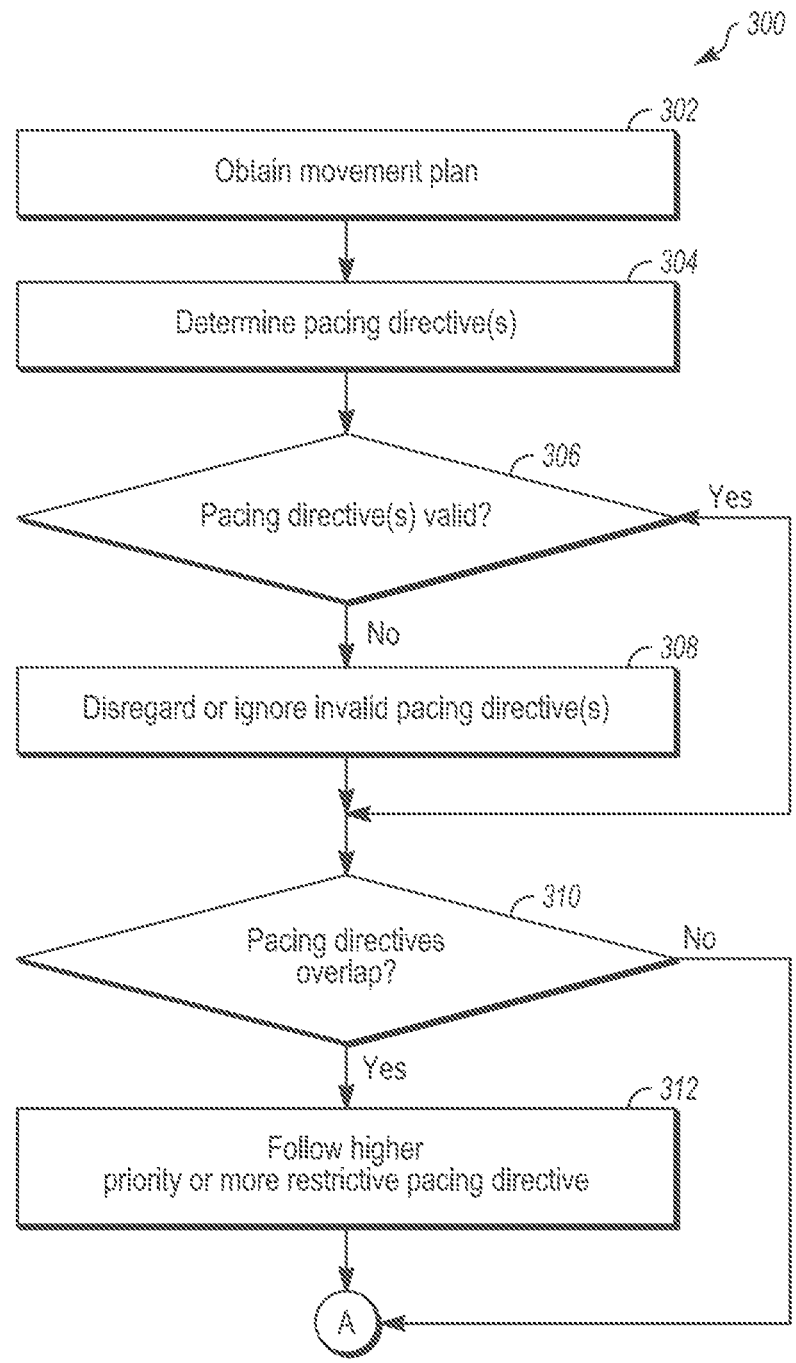

FIGS. 5A and 5B illustrate a flowchart of one example of a method 300 for controlling movement of one or more vehicle systems. The method can represent software operating on and/or operations performed by the network control system (e.g., off-board the vehicle systems) and/or the vehicle control system (e.g., onboard a vehicle system). In one embodiment, some operations of the method can be performed by the network control system while one or more other operations are performed by the vehicle control system. Optionally, one or more operations of the method can be performed by both the network control system and the vehicle control system. Alternatively, all of the operations of the method can be performed by one of the network control system or the vehicle control system.

At step 302, a movement plan is obtained. The movement plan may include several schedules for several vehicles to concurrently move within a network of routes. For example, the movement plan can dictate which routes different vehicle systems are to travel along (and, optionally, when the vehicle systems are to travel on the routes). Alternatively, the movement plan can include a single schedule for a single vehicle system. The movement plan can be obtained from a scheduling system. The movement plan can be created to coordinate movements of the vehicle systems to manage throughput of the vehicle systems through networks of routes.

At step 304, one or more pacing directives with associated pacing instructions are determined. The pacing directives and instructions can be default directives associated with different route segments, can be automatically generated, or the like. In one embodiment, the pacing directives and instructions associated with the routes that a vehicle system is on and/or will travel on (e.g., according to the movement plan) are communicated to the vehicle system. Alternatively, all pacing directives and instructions associated with a set (e.g., network) of routes may be communicated to all vehicle systems that are and/or will be traveling on the routes (e.g., according to the movement plan). Optionally, pacing directives and instructions can be communicated to vehicle systems as the vehicle systems approach the route segments associated with the directives and instructions.

At step 306, a decision is made as to whether the pacing directives that are received are valid. This validity check on the pacing directives can determine whether the pacing directives incorrectly identify the route segments with which the pacing directives are associated, whether the pacing directives include incorrect boundaries (e.g., the milepost(s) of the pacing directives are not provided), or the like. If the pacing directive(s) are valid, then the pacing instructions associated with the pacing directives can be used to control movement of the vehicle system(s). As a result, flow of the method can proceed toward step 310. But if one or more pacing directives are invalid, then these invalid pacing directives are not to be used to control movement of vehicle systems. As a result, flow of the method can proceed toward step 308. At step 308, the invalid pacing directives are ignored or disregarded. For example, the pacing directives may not be communicated to the vehicle control systems, the vehicle control systems may receive the pacing directives but not limit or change movement of the vehicle systems based on the pacing directives, or the like.

At step 310, a decision is made as to whether two or more of the pacing instructions within the same pacing directive overlap (e.g., conflict with) each other. For example, the network control system and/or vehicle control system can determine whether the same segment of route (or portion of a route) is associated with two or more different pacing instructions. If two or more instructions apply to the same portion of a route, then a decision on which instruction to follow or use for controlling movement of vehicle systems may need to be made. As a result, flow of the method can proceed toward step 312. Otherwise, flow of the method can proceed toward step 314 (shown in FIG. 3B).

At step 312, one of the overlapping pacing instructions is selected for use in controlling movement of the vehicle systems through the route segment associated with the pacing directive that includes the pacing instructions. In one example, the different pacing instructions may be associated with different restrictions (e.g., different upper limits on speed). The pacing instruction that is selected may be the most restrictive of the conflicting instructions.

At step 314, a decision is made as to whether minimum requirements for pacing directives are met. For example, the pacing directives may be required to extend at least a minimum threshold distance over route(s), to last for at least a minimum threshold time period, or the like. If a pacing directive does not meet a minimum requirement, then controlling vehicle systems according to the pacing directive can cause too rapid of a change in speeds of the vehicle systems, too frequent of changes in throttle or brake settings, and the like. These changes may increase the risk of damage to the vehicle system, may cause the vehicle system to operate in an unsafe manner, or the like. Accordingly, if a pacing directive does not meet the minimum requirements, then the pacing directive may need to be changed or discarded. As a result, flow of the method can proceed toward step 316. If the pacing directive meets the minimum requirement(s), then the pacing instructions within the pacing directive may be used to dictate movement of vehicle systems. As a result, flow of the method can proceed toward step 318.

At step 316, the pacing directive that does not meet the minimum requirements can be discarded or changed. If the pacing directive is discarded, then the pacing instruction(s) of the discarded pacing directive is or are not used to limit or otherwise dictate how vehicle systems move within the route segment of the discarded pacing directive. If the pacing directive is changed, then the starting location and/or ending location of the pacing directive can be changed so that the pacing directive meets the minimum distance and/or time requirement.

At step 318, a decision is made as to whether the pacing instructions for one or more pacing directives match the direction of travel of a vehicle system. Different pacing instructions may be associated with different directions of travel. For example, a "to" pacing instruction on a route segment may be associated with a first direction of travel on that route segment, but not with an opposite, second direction of travel on that route segment. If a pacing instruction is associated with a direction of travel that is not the same as the direction in which a vehicle system is or will move within the route segment of the pacing directive having the pacing instruction, then the pacing instruction may need to be discarded or modified. As a result, flow of the method can proceed toward step 320. If the pacing instruction is associated with the same direction of travel in which the vehicle system is or will move within the route segment of the pacing directive that includes the pacing instruction, then the pacing instruction may be used to dictate or limit movement of the vehicle system without disregarding the pacing instruction. As a result, flow of the method can proceed toward step 322.

At step 320, the pacing instruction associated with a direction of travel that differs from the direction of movement of a vehicle system is discarded. With respect to changing the pacing instruction, the direction of travel of the pacing instruction can be changed, a speed limit of the instruction can be changed, etc.

The pacing instructions can be tailored to fit the route segments being, or that will be, traversed by the vehicle system. In one embodiment, the "from" or "to" limits of a pacing directive are not changed, but a portion of one pacing instruction can be applied to a current route of the vehicle system. The pacing instruction can be bi-directional in that the pacing instruction can have different limits based on the direction of travel of vehicle systems moving in the segment associated with the pacing directive having the bi-directional pacing instruction.

At step 322, movement of vehicle systems are controlled according to the pacing instructions of the pacing directives. The vehicle control system can change throttle settings and/or brake settings to cause the movement of the vehicle system to occur according to the movement plan or schedule, while also meeting the requirements or not exceeding restrictions of the pacing instructions that govern movement within different pacing directives. Flow of the method can return to one or more prior operations or may terminate.

In one example, a method is provided that includes obtaining a movement plan that includes schedules for movements of vehicle systems traveling in a network of routes. The movement plan may be generated by a network control system located off-board the vehicle systems. The method also may include determining pacing directives associated with different segment of the routes. The pacing directives may dictate upper limits and/or lower limits on movement for travel by the vehicle systems in the different segments of the routes while the vehicle systems are traveling according to the schedules of the movement plan. The method also may include controlling movement of the vehicle systems to meet the schedules of the movement plan while the vehicle systems move according to the pacing directives in the corresponding different segments of the routes.

The pacing directives for at least one of the segments of the routes may change at different times. At least one of the pacing directives may dictate a maximum throttle setting for the vehicle systems traveling in the segment of the route associated with the at least one of the pacing directives. At least one of the pacing directives may dictate a minimum time offset for the vehicle systems traveling in the segment of the route associated with the at least one of the pacing directives. The minimum time offset may dictate an amount of time for completion of travel of the vehicle systems through the segment of the route associated with the at least one of the pacing directives.

At least one of the pacing directives may dictate an energy conservation speed that the vehicle systems are restricted from traveling faster than during travel through the segment of the route associated with the at least one of the pacing directives. At least one of the pacing directives may dictate a time of arrival that the vehicle systems are required to reach an end of the segment of the route associated with the at least one of the pacing directives. The pacing directives may differ for the different segments of the routes.

The method also may include determining a change in at least one of the pacing directives during movement of at least one of the vehicle systems in the routes, and changing movement of the vehicle systems to meet the schedules of the movement plan while the vehicle systems move according to the change in the at least one of the pacing directives. The method also may include determining that two or more of the pacing directives are associated with a common segment of the segments of the routes and have different movement requirements or movement restrictions, and determining which of the two or more of the pacing directives is most restrictive based on one or more of a type of the segments of the routes associated with the two or more of the pacing directives. The movement of the vehicle systems may be controlled according to the movement requirements and the movement restrictions of the pacing directive of the two or more pacing directives that is most restrictive.

The method also may include determining that a distance between the segments of the routes having the pacing directives is shorter than a threshold distance, and extending and/or shortening the segment of the routes associated with at least one of the pacing directives responsive to determining that the distance is shorter than the threshold distance.

In another example, a control system is provided that includes one or more processors that may obtain at least part of a movement plan that includes schedules for movements of vehicle systems traveling in a network of routes. The movement plan may be generated by a network control system located off-board the vehicle systems. The one or more processors may obtain pacing directives associated with different segment of the routes that a first vehicle system of the vehicle systems is traveling or will travel on according to the movement plan. The pacing directives may dictate upper limits and/or lower limits on movement of the first vehicle system in the different segments of the routes while the vehicle systems are traveling according to the schedules of the movement plan. The one or more processors may control movement of the first vehicle system to meet the schedules of the movement plan while the first vehicle system moves according to the pacing directives in the corresponding different segments of the routes.

The pacing directives for at least one of the segments of the routes may change at different times. At least one of the pacing directives may dictate a maximum throttle setting for the first vehicle system traveling in the segment of the route associated with the at least one of the pacing directives. At least one of the pacing directives may dictate a minimum time offset for the first vehicle system traveling in the segment of the route associated with the at least one of the pacing directives. The minimum time offset may dictate an amount of time for completion of travel of the first vehicle system through the segment of the route associated with the at least one of the pacing directives.

At least one of the pacing directives may dictate an energy conservation speed that the first vehicle system is restricted from traveling faster than during travel through the segment of the route associated with the at least one of the pacing directives. At least one of the pacing directives may dictate a time of arrival that the first vehicle system is required to reach an end of the segment of the route associated with the at least one of the pacing directives.

In another example, another method includes obtaining a movement plan that includes schedules for movements of vehicle systems traveling in a network of routes. The movement plan may be generated by a network control system located off-board the vehicle systems. The method also may include determining pacing directives associated with different segment of the routes for a first vehicle system of the vehicle systems. The pacing directives may dictate upper limits and/or lower limits on movement of the vehicle systems in the different segments of the routes while the vehicle systems are traveling according to the schedules of the movement plan. The method also may include controlling movement of the first vehicle system to meet the schedules of the movement plan while the first vehicle system moves according to the pacing directives in the corresponding different segments of the routes.

The method also may include determining that two or more of the pacing directives are associated with a common segment of the segments of the routes and have different movement requirements or movement restrictions, and determining which of the two or more of the pacing directives is most restrictive based on a type of the segments of the routes associated with the two or more of the pacing directives. Movement of the first vehicle system may be controlled according to the movement requirements and the movement restrictions of the pacing directive of the two or more pacing directives that is most restrictive.

The method also may include determining that a distance between the segments of the routes having the pacing directives for the first vehicle system is shorter than a threshold distance, and extending and/or shortening the segment of the routes associated with at least one of the pacing directives of the first vehicle system responsive to determining that the distance is shorter than the threshold distance.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic instruction to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    obtaining a movement plan that includes schedules for movements of vehicle systems traveling in a network of routes, the movement plan generated by a network control system located off-board the vehicle systems;
    determining pacing directives associated with different segment of the routes, the pacing directives dictating one or more of upper limits or lower limits on movement for travel by the vehicle systems in the different segments of the routes while the vehicle systems are traveling according to the schedules of the movement plan; and
    based on the pacing directives meeting minimum requirements for a segment of the routes, controlling movement of the vehicle systems to meet the schedules of the movement plan while the vehicle systems move according to the pacing directives in the corresponding different segments of the routes, wherein the minimum requirements comprise at least one of a minimum threshold distance over the routes of the pacing directive or a minimum threshold time period of the pacing directive to prevent a change of pacing directives within the at least one of the minimum threshold distance or the minimum threshold time period.

2. The method of claim 1, wherein controlling the movement of the vehicle systems comprises changing the pacing directives, generated by one of the network control system or a vehicle control system, for at least one of the segments of the routes.

3. The method of claim 1, wherein at least one of the pacing directives dictates a maximum throttle setting for the vehicle systems traveling in the segment of the route associated with the at least one of the pacing directives.

4. The method of claim 1, wherein at least one of the pacing directives dictates a minimum time offset for the vehicle systems traveling in the segment of the route associated with the at least one of the pacing directives, the minimum time offset dictating an amount of time for completion of travel of the vehicle systems through the segment of the route associated with the at least one of the pacing directives.

5. The method of claim 1, wherein at least one of the pacing directives dictates an energy conservation speed that the vehicle systems are restricted from traveling faster than during travel through the segment of the route associated with the at least one of the pacing directives.

6. The method of claim 1, wherein at least one of the pacing directives dictates a time of arrival that the vehicle systems are required to reach an end of the segment of the route associated with the at least one of the pacing directives.

7. The method of claim 1, wherein the pacing directives differ for the different segments of the routes.

8. The method of claim 1, further comprising:
    determining a change in at least one of the pacing directives during movement of at least one of the vehicle systems in the routes; and changing movement of the vehicle systems to meet the schedules of the movement plan while the vehicle systems move according to the change in the at least one of the pacing directives.

9. The method of claim 1, further comprising:
determining that two or more of the pacing directives are associated with a common segment of the segments of the routes and have different movement requirements or movement restrictions; and
determining which of the two or more of the pacing directives is most restrictive based on one or more of a type of the segments of the routes associated with the two or more of the pacing directives,
wherein movement of the vehicle systems is controlled according to the movement requirements and the movement restrictions of the pacing directive of the two or more pacing directives that is most restrictive.

10. The method of claim 1, further comprising:
determining that a distance between the segments of the routes having the pacing directives is shorter than a threshold distance; and
one or more of extending or shortening the segment of the routes associated with at least one of the pacing directives responsive to determining that the distance is shorter than the threshold distance.

11. A control system comprising:
one or more processors configured to obtain at least part of a movement plan that includes schedules for movements of vehicle systems traveling in a network of routes, the movement plan generated by a network control system located off-board the vehicle systems, the one or more processors configured to obtain pacing directives associated with different segment of the routes that a first vehicle system of the vehicle systems is traveling or will travel on according to the movement plan, the pacing directives dictating one or more of upper limits or lower limits on movement of the first vehicle system in the different segments of the routes while the vehicle systems are traveling according to the schedules of the movement plan, based on the pacing directives meeting minimum requirements for a segment of the routes, the one or more processors configured to control movement of the first vehicle system to meet the schedules of the movement plan while the first vehicle system moves according to the pacing directives in the corresponding different segments of the routes, wherein the minimum requirements comprise at least one of a minimum threshold distance over the routes of the pacing directive or a minimum threshold time period of the pacing directive to prevent a change of pacing directives within the at least one of the minimum threshold distance or the minimum threshold time period.

12. The control system of claim 11, wherein controlling the movement of the vehicle systems comprises changing the pacing directives, generated by the network control system or the one or more processors, for at least one of the segments of the routes.

13. The control system of claim 11, wherein at least one of the pacing directives dictates a maximum throttle setting for the first vehicle system traveling in the segment of the route associated with the at least one of the pacing directives.

14. The control system of claim 11, wherein at least one of the pacing directives dictates a minimum time offset for the first vehicle system traveling in the segment of the route associated with the at least one of the pacing directives, the minimum time offset dictating an amount of time for completion of travel of the first vehicle system through the segment of the route associated with the at least one of the pacing directives.

15. The control system of claim 11, wherein at least one of the pacing directives dictates an energy conservation speed that the first vehicle system is restricted from traveling faster than during travel through the segment of the route associated with the at least one of the pacing directives.

16. The control system of claim 11, wherein at least one of the pacing directives dictates a time of arrival that the first vehicle system is required to reach an end of the segment of the route associated with the at least one of the pacing directives.

17. A method comprising:
obtaining a movement plan that includes schedules for movements of vehicle systems traveling in a network of routes, the movement plan generated by a network control system located off-board the vehicle systems;
determining pacing directives associated with different segment of the routes for a first vehicle system of the vehicle systems, the pacing directives dictating one or more of upper limits or lower limits on movement of the vehicle systems in the different segments of the routes while the vehicle systems are traveling according to the schedules of the movement plan;
determining the pacing directives meet minimum requirements, wherein the minimum requirements comprise at least one of a minimum threshold distance over the routes of the pacing directive or a minimum threshold time period of the pacing directive to prevent a change of pacing directives within the at least one of the minimum threshold distance or the minimum threshold time period; and
based on the pacing directives meeting the minimum requirements for a segment of the routes, controlling movement of the first vehicle system to meet the schedules of the movement plan while the first vehicle system moves according to the pacing directives in the corresponding different segments of the routes.

18. The method of claim 17, further comprising:
determining that two or more of the pacing directives are associated with a common segment of the segments of the routes and have different movement requirements or movement restrictions; and
determining which of the two or more of the pacing directives is most restrictive based on one or more of a type of the segments of the routes associated with the two or more of the pacing directives.

19. The method of claim 18, wherein movement of the first vehicle system is controlled according to the movement requirements and the movement restrictions of the pacing directive of the two or more pacing directives that is most restrictive.

20. The method of claim 17, further comprising:
determining that a distance between the segments of the routes having the pacing directives for the first vehicle system is shorter than a threshold distance; and
one or more of extending or shortening the segment of the routes associated with at least one of the pacing directives of the first vehicle system responsive to determining that the distance is shorter than the threshold distance.

* * * * *